United States Patent [19]
Venhuizen

[11] Patent Number: 5,360,982
[45] Date of Patent: Nov. 1, 1994

[54] OPTOELECTRONIC SEMICONDUCTOR HAVING A GROOVE-SHAPED WAVEGUIDE

[75] Inventor: Antonius H. J. Venhuizen, Eindhoven, Netherlands

[73] Assignee: U.S. Philips Corporation, New York, N.Y.

[21] Appl. No.: 161,043

[22] Filed: Dec. 1, 1993

Related U.S. Application Data

[63] Continuation of Ser. No. 957,299, Oct. 6, 1992.

[30] Foreign Application Priority Data

Oct. 8, 1991 [EP] European Pat. Off. ........ 91202606.9

[51] Int. Cl.$^5$ .................... G02B 5/08; G02B 7/18; H01L 27/14; H01L 31/00
[52] U.S. Cl. ........................... 385/14; 385/43; 385/122; 385/130; 385/132; 385/133; 257/80; 257/81; 257/117; 257/118; 257/432
[58] Field of Search ............... 385/122, 130, 132, 129, 385/131, 133, 14, 43; 257/432, 80, 81, 98, 117, 118, 432; 333/247

[56] References Cited

U.S. PATENT DOCUMENTS

| | | | |
|---|---|---|---|
| 4,762,382 | 8/1988 | Husain et al. | 385/132 |
| 4,896,930 | 1/1990 | Tsuchitani et al. | 385/122 |
| 5,009,476 | 4/1991 | Reid et al. | 257/82 |
| 5,037,168 | 8/1991 | Young et al. | 385/130 |
| 5,179,566 | 1/1993 | Iwano et al. | 385/130 |

FOREIGN PATENT DOCUMENTS

| | | | |
|---|---|---|---|
| 2203305 | 2/1990 | Japan . | |
| 2-310540 | 12/1990 | Japan | 385/130 |
| 3-10205 | 1/1991 | Japan | 385/130 |

OTHER PUBLICATIONS

Mann et al., "Fabrication and Characterization of Processable Polydiacetylene Waveguides", SPIE, vol. 971, Nonlinear Optical Properties of Organic Materials, 1988.

Balliet et al., "Method of Aligning Optical Fibers with LSI Chips Containing Optical Light-Emitting Source and/or Receivers", IBM Technical Disclosure Bulletin, vol. 25, No. 4, Sep. 1982, pp. 2188–2189.

"Fabrication and Characterization of Processable Polydiacetylene Waveguides" S. Mann et al., SPIE, vol. 971, Nonlinear Optical Properties of Organic Materials, 1988, pp. 245–251.

Primary Examiner—Andrew J. James
Assistant Examiner—Alice W. Tang
Attorney, Agent, or Firm—Steven R. Biren

[57] ABSTRACT

Optoelectronic semiconductor devices which have a groove-shaped waveguide in an oxide layer provided on a silicon substrate are compact, easy to manufacture, and—when the waveguide comprises a non-linear optical material—applicable inter alia for frequency doubling of laser radiation. In known devices, scattering losses occur in the waveguide owing to the roughness of the groove which arises during etching of the groove. Here, the groove and a portion of the oxide layer are formed by local, preferably thermal, oxidation of the silicon substrate. The groove formed at the area of the oxidation mask has a smoother surface and as a result the waveguide has lower losses. When the device includes a GaAs/AlGaAs diode laser, it forms an efficient, compact, inexpensive and blue-emitting laser source which is suitable for use in an optical disc system. Preferably, the diode laser is situated in a deeper and wider further groove in the oxide layer. The devices may be made by a method in which, a layer of silicon oxide and a groove therein are formed simultaneously through the use of local oxidation. Grooves of different widths and depths are obtained by using masks of various widths.

8 Claims, 2 Drawing Sheets

OPTOELECTRONIC SEMICONDUCTOR HAVING A GROOVE-SHAPED WAVEGUIDE

This is a continuation of application Ser. No. 07/957,299, filed Oct. 6, 1992.

BACKGROUND OF THE INVENTION

The invention relates to an optoelectronic semiconductor device with a waveguide, comprising a semiconductor body with a silicon substrate on which are present in that order a first layer of a material comprising silicon oxide and having a groove and a second layer of a radiation-guiding material which forms the waveguide at the area of the groove. The invention also relates to a method of manufacturing such a device.

Such semiconductor devices are used inter alia in optoelectronic systems in the field of optical telecommunication. They are also used in systems for frequency doubling in which laser radiation with a wavelength of $\lambda/2$ is formed from laser radiation with a wavelength $\lambda$ in a non-linear optical material. The use of a waveguide is of major importance here because the radiation must remain concentrated over a larger distance for an efficient frequency doubling. The use of a silicon substrate has several technological advantages, among them the posibility of cleaving.

Such an optoelectronic semiconductor device is known from the article by S. Mann et al. "Fabrication and Characterization of Processable Polydiacetylene Waveguides" published in SPIE, vol. 971, Nonlinear Optical Properties of Organic Materials, 1988, pp. 245–251. The known device with a waveguide comprises a semiconductor body with a silicon substrate on which are present in that order a layer of material comprising silicon oxide, in this case silicon oxynitride, and having a groove, and a layer of a diacetylene polymer—a non-linear optical material—which forms the waveguide at the area of the groove. The layer comprising silicon oxide is formed by means of PECVD (=Plasma Enhanced Chemical Vapor Deposition), whereas the groove is formed by means of RIE (=Reactive Ion Etching), for which a mask having a strip-shaped opening is used. The known device is used as a non-linear waveguide or as an optical switch. The first layer must be comparatively thick for effective operation of the waveguide.

A disadvantage of the known device is that the walls and bottom of the groove are comparatively rough as a result of the etching. The roughness or raggedness of the edges of the mask used for etching also contributes to the roughness of the walls. When radiation is introduced into such a waveguide, scattering of a portion of this radiation will occur at the unevennesses in the bottom and the walls. The efficiency of the radiation transport by the waveguide is reduced by this. This is obviously undesirable. A further disadvantage of the known device is that it is not easy to manufacture: reflections occur in the comparatively thick first layer during the photolithographic generation of the etching mask. The generation of the mask is rendered more difficult by this.

SUMMARY OF THE INVENTION

The invention has for its object inter alia to provide an optoelectronic semiconductor device comprising a waveguide in which the above disadvantages are entirely or at least partly counteracted. The invention also proposes a simple method of manufacturing such a device.

A device of the kind mentioned above is for this purpose characterized in that the groove and a portion of the first layer are formed by means of local oxidation of the silicon substrate. Owing to the use of a growth process, i.e. oxidation, a first layer of silicon oxide is obtained which is very smooth. The roughness of this layer is in fact mainly determined by the roughness of the surface to be oxidized, so of the silicon substrate, which is very smooth. A groove is formed in the first layer through the use of local oxidation, preferably local thermal oxidation, at the area of the mask used during the oxidation. Etching of a groove, and the accompanying roughening of the surface of the first layer, can be omitted as a result. The device according to the invention thus has a groove acting as a waveguide with particularly smooth walls and bottom, so that the waveguide guides radiation very efficiently. A cross-section perpendicular to the longitudinal direction of the waveguide in a device according to the invention shows a picture characteristic of local oxidation: on either side of the groove the first layer is recessed into the substrate at least over part of its thickness.

In an important embodiment of the device according to the invention, the radiation-guiding material of the second layer comprises a non-linear optical material. Generation of higher harmonics of the radiation carded by the waveguide in such a material has among its results a frequency doubling of this radiation. Preferably, the non-linear optical material is a polymer. Such a material is not only expensive, but also easy to apply. When the device also comprises a semiconductor diode laser coupled to the waveguide, a short-wave radiation source is created which is efficient, compact, and inexpensive. The use of a GaAs/AlGaAs semiconductor diode laser which emits at, for example, 0.8 $\mu$m, results in a device according to the invention which emits laser radiation with a wavelength of 0.5 $\mu$m. A laser source emitting in the blue part of the spectrum is very suitable for use in an optical disc system where a much greater information density can be achieved due to the blue radiation than in conventional optical disc systems. Very advantageous devices acording to the invention comprise a first layer with a thickness of between 2 and 4 $\mu$m, a width and depth of the groove lying between 2 and 20 $\mu$m and between 0.1 and 1 $\mu$m, respectively, and a second layer with a thickness of between approximately 0.1 and 10 $\mu$m.

A further embodiment is characterized in that the first layer comprises a further groove, designated second groove, which is situated in the extended direction of the first groove, which is deeper and wider than the first groove, and which contains an optoelectronic element of which the optically active region is at the level of the first groove. Since the second groove is much wider, it can contain a comparatively large optoelectronic component, for example, the semiconductor diode laser retorted to above. The greater depth of the second groove renders an automatic alignment of the active region of the optoelectronic component relative to the waveguide possible. Such a device, furthermore, is easy to manufacture. Preferably, the second groove is formed simultaneously with the first groove and, like the latter, by means of local oxidation of the substrate. This renders the manufacture of the device even simpler. This object is achieved in that a wider mask is used for the local oxidation of the second groove than of the first groove: the silicon below the second mask is better protected from oxidation by this, so that the second groove will be not only wider but also deeper. The first layer on either side of the second groove will accordingly be recessed over a greater portion of its thickness than on either side of the first groove in a cross-section of this embodiment. The optoelectronic component may be, instead of a semiconductor diode laser, a radiation detector, for example a photodiode, or another waveguide. Such a device also offers the possibility of integrating a so-called geodetic lens. A further embodiment of a device according to the invention comprises two grooves, which may or may not have the same width, and which intersect one another at an angle. Such a device offers the possibility of realizing particularly low-loss crossings of waveguides. In such an embodiment, the lateral dimensions of the mask used for the oxidation are greater at the area of the crossing than elsewhere above the waveguide for reasons of geometry. This means that the screening by the mask at the area of the crossing is better than above the straight portions of the waveguide. As a result, the groove at the area of the crossing is somewhat deeper than outside it. This means that the losses at such a crossing are reduced even further.

A method of manufacturing an optoelectronic semiconductor device with a waveguide, whereby a first layer of a material comprising silicon oxide is provided on a silicon substrate, a groove is formed in the first layer, and a second layer of a radiation-guiding material is provided over the first layer so that the waveguide is formed at the area of the groove, according to the invention, is characterized in that the groove is formed through the use of local oxidation of the silicon, which oxidation is locally inhibited by a mask of a material which is not or at least substantially not permeable to oxygen, for example and preferably made of silicon nitride or a silicon oxynitride rich in nitrogen. A device according to the invention, i.e. a device with a waveguide which has very low radiation losses, is obtained in a simple manner by this method. In addition, this method has the advantage that the photolithographic process step required for it takes place when the first layer is still absent or is still only very thin. The result is that no or at least considerably fewer reflections occur during this process step than in the known method. Another advantage of a method according to the invention is that the oxidation used therein, which will often be a thermal oxidation, can be carried out in a highly controlled and accurate manner. The depth of the groove to be formed can be very accurately set as a result.

An important embodiment of a method according to the invention is characterized in that a further groove, designated second groove, is formed in the first layer during the local oxidation, a wider mask being used for forming the second groove than for forming the first groove. Several grooves having different widths and depths are formed in a simple manner, i.e. in one and the same process step, by this method. This offers the possibility of integrating other and larger optoelectronic components such as semiconductor diode lasers, which components can be readily aligned relative to the waveguide. In the manufacture of crossing grooves, waveguides are created whose losses at the area of the crossing are particularly low. Various modifications of such devices have already been discussed above. In a further modification of a method according to the invention, a thin, preferably thermal oxide is provided on the silicon substrate, over which a strip-shaped mask of silicon nitride is provided, upon which a local, preferably thermal oxidation is carried out whereby the first layer and the groove are formed, after which the mask is removed and the second layer is provided. In such a method, fewer stresses are created in the semiconductor device compared with the situation when the mask is directly provided on the substrate. The thermal oxide remains thin below a wide mask, and a comparatively wide and deep groove is created above it. Positioning of, for example, a semiconductor diode laser in such a groove accordingly is not made impossible by poor heat removal arising from the presence of a thick, thermally insulating layer there. If a deep groove is desired with only a thin oxide layer below it, a layer of thermal oxide of, for example, approximately 15 nm is provided before the mask is provided, and the mask is formed in a silicon nitride layer of, for example, approximately 220 nm. For a less deep groove, these thicknesses may be chosen between 30 and 300 nm and around 100 nm, respectively. Preferably, a non-linear optical material is chosen for the second layer in view of the application discussed above. If a polymer in solution is used for this, the second layer can be provided in a simple manner, i.e. by spin-coating, possibly after an optoelectronic component has been inserted in a second groove, if present.

BRIEF DESCRIPTION OF THE DRAWING

The invention will now be discussed in more detail with reference to an embodiment and the accompanying drawing, in which.

The Figures are diagrammatic and not drawn to scale, the dimensions in the thickness direction being particularly exaggerated for greater clarity. Corresponding parts are generally given the same reference numerals in the various Figures.

DESCRIPTION OF THE PREFERRED EMBODIMENT

Figure 1:
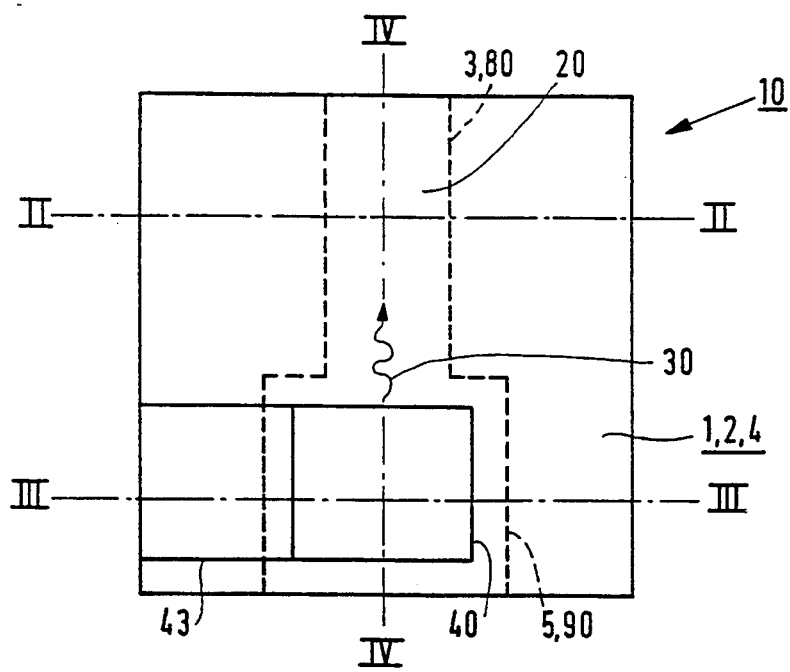
FIG. 1 diagrammatically shows in plan view an embodiment of an optoelectronic semiconductor device according to the invention.
Figure 2:
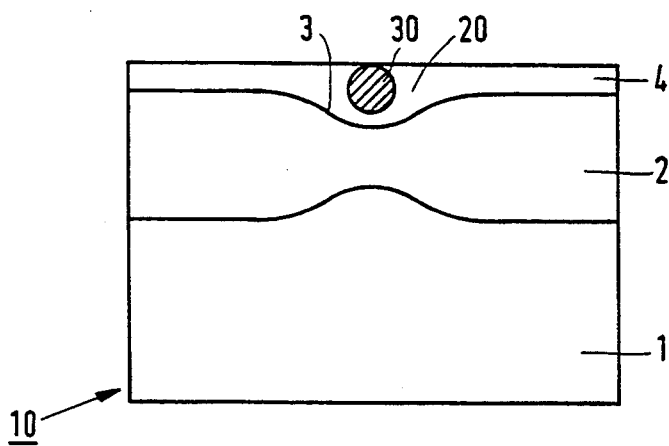
FIGS. 2 to 4 diagrammatically show the device of FIG. 1 in cross-section taken on the lines II—II, III—III, and IV—IV.
Figure 3:
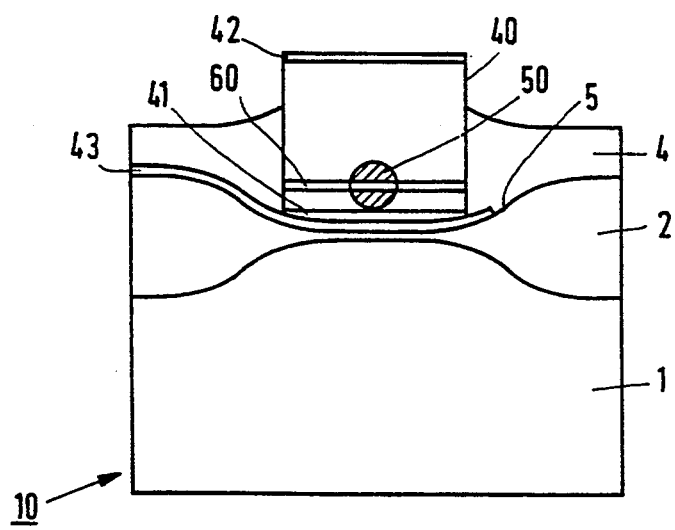
Figure 4:
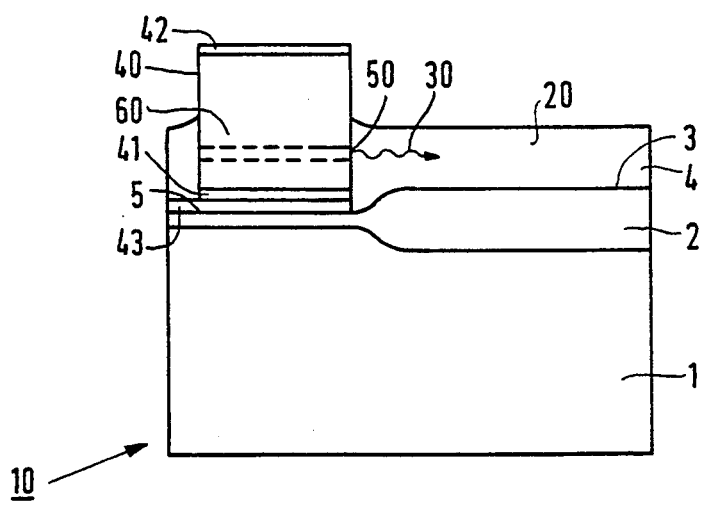
Figure 7:
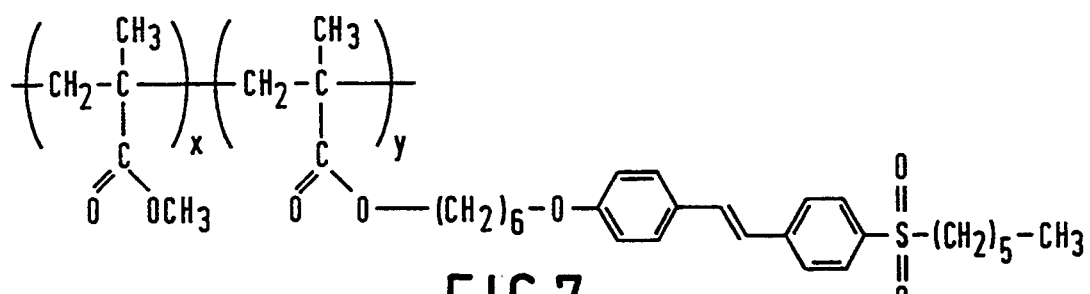
FIG. 7 shows the composition of the polymer material of the device of FIG. 1.

FIG. 1 diagrammatically shows an embodiment of an optoelectronic semiconductor device according to the invention in plan view. FIGS. 2 to 4 diagrammatically show the device of FIG. 1 in cross-section taken on the lines II—II, III—III and IV—IV. The device has a waveguide 20 and comprises a semiconductor body 10 with a silicon semiconductor substrate 1. On this substrate are present in that order a first layer 2 of a material comprising silicon oxide, in this case silicon dioxide, which has a groove 3, and a second layer 4 of a radiation-guiding material which forms the waveguide 20 at the area of the groove 3. According to the invention, the groove 3 and a portion of the first layer 2 are formed through local oxidation of the silicon substrate 1. As a result, the groove 3 has a smoother bottom and smoother side walls than would be the case if it were formed through etching, as in the known device. Thanks to the smoothness of the surface of the first layer 2 within the groove 3, there is less scattering of radiation 30 at the walls of the waveguide 20, so that the latter has lower losses. The cross-section of FIG. 3 shows a picture, characteristic of local oxidation, of an oxide layer 2 locally recessed into the substrate over part of its thickness. In addition, the device according to the invention has the advantage that it is easy to manufacture. In this example, the radiation-guiding layer 4 comprises a non-linear optical material, here in the form of a polymer whose composition is shown in FIG. 7, in which the mole fractions x and y are both equal to 0.5 and in which the average molecular weight is approximately 15000. This polymer material, and other suitable polymer materials and their manufacture, are described in U.S. Pat. No. 5,006,729. The result is that the device is highly suitable for frequency doubling and can thus be used in an optical disc system operated with radiation which has a much smaller wavelength than usual. Since the polymer can be provided by means of spin coating, the manufacture of the device is simple. The thickness of the radiation-guiding layer 4 is approximately 2 $\mu$m. The width of the groove 3 in this example is approximately 5 $\mu$m, the depth of the groove 3 is approximately 0.3 $\mu$m, and the length of the groove 3 is approximately 8 mm, while the thickness of the first layer 2 next to the groove 3 is approximately 4 $\mu$m and below the groove 3 approximately 3.4 $\mu$m. In this embodiment, the first layer 2 has a further groove 5, designated second groove, which lies in the extended direction of the first groove 3, is deeper and wider than the first groove 3, and comprises an optoelectronic element 40, here a GaAs/AlGaAs semiconductor diode laser 40 whose optically active region 50, which here lies in the center of an active layer 60, is at the level of the first groove 3 in which the waveguide 20 is situated. As shown in FIG. 1, both the first groove 3 and the second groove 5 extend lengthwise in the vertical direction in the plan view, along the line IV—IV. The width of first groove 3 is depicted in the horizontal direction, along the line II—II, while the width of the second groove 5 is also in the horizontal direction, along the line III—III. In such a device, an optoelectronic component is integrated and automatically aligned in a simple manner through a suitable choice of the depths of the first groove 3 and the second groove 5. The second groove 5 in this example is also formed by local oxidation of the substrate 1, simultaneously with the first groove 3. This further simplifies the manufacture of such a device. The greater width and depth of the second groove 5 (see FIGS. 2, 3 and 4) may be realized in a simple manner in that a wider mask is used for the local oxidation at the area of the second groove 5 than at the area of the first groove 3. The diode laser 40 is here provided with two conducting layers 41, 42 comprising gold and is provided in usual manner, for example through soldering, on a metallization 43 comprising gold and connected to the poles of a voltage source through wire connections which are not shown in the Figures. The connection of conductor 41 may also be effected through the substrate 1. In that case, the metallization 43 is for that purpose connected to the silicon substrate 1 through a window in the first layer 2, for example, in the bottom of the groove 5. The width of the second groove 5 in this example is approximately 1 mm, the length is approximately 2 mm and the depth of the groove 5 is approximately 2 $\mu$m, while the thickness of the first layer 2 next to the groove 5 is approximately 4 $\mu$m, as it is next to the groove 3, and is approximately 0.1 $\mu$m below the groove 5. The dimensions of the diode laser 40 are approximately 300×300 $\mu$m$^2$. The height of the laser 40 is approximately 150 $\mu$m, while the active layer 60 lies at approximately 3 $\mu$m above the bottom of the second groove 5, and accordingly at the level of the waveguide 20 in the first groove 3. The first groove 3 and the second groove 5 are here directly connected to one another and the semiconductor diode laser 40 is situated at a shorter distance, here approximately a few micrometers, from the transition between the grooves. Near the transition between the two grooves, the depth of the groove shows a more or less gradual transition. This is based on the same effect as that mentioned in the descriptive introduction referring to the case of two grooves intersecting at an angle.

Figure 5:
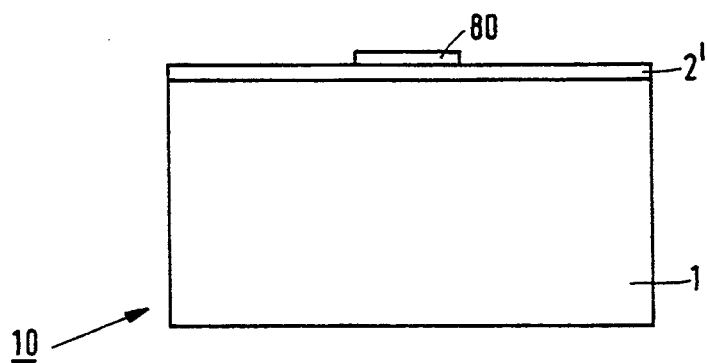
FIGS. 5 to 6 diagrammatically show the device of FIG. 1 in subsequent stages of manufacture by means of a method according to the invention in cross-section taken on the line II—II.
Figure 6:
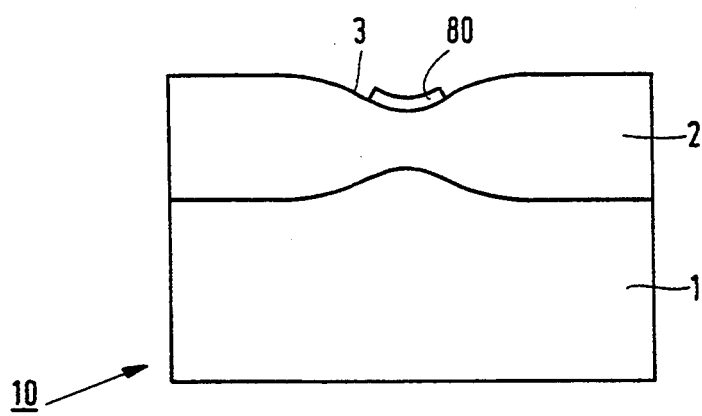

According to the invention, the optoelectronic semiconductor device described is manufactured as follows (see also FIG. 5 and FIG. 6). The basic material is a substrate 1 of monocrystalline p-type silicon, here with a (001) orientation. On this substrate, a thin layer 2' of a material comprising silicon oxide, here an approximately 40 nm thick layer of silicon dioxide, is provided, for example through thermal oxidation, in the present example (see FIG. 5). According to the invention, subsequently, a layer 80 substantially impermeable to oxygen is provided thereon, here an approximately 100 nm thick layer of silicon nitride, in which a strip-shaped mask 80 with a width of approximately 5 $\mu$m is formed by means of photolithography at the area of a first groove 3 to be formed. Then (see FIG. 6) a first layer 2 of a material comprising silicon oxide, here of silicon dioxide, is provided, which layer 2 comprises the thin layer 2' of silicon dioxide, while the first groove 3 is formed through local oxidation of the silicon 1, this oxidation being locally inhibited by the silicon nitride mask 80. In this embodiment of a method according to the invention, a second groove 5 is formed simultaneously with the first groove 3, also through local oxidation, which second groove 5 lies in the extended direction of the first groove 3 and is wider and deeper. For this purpose, a mask 90 of silicon nitride (see FIG. 1) is provided simultaneously with the mask 80. The mask 90 is also strip-shaped, wider than the mask 80, here approximately 1 mm wide, and is formed in the extension of the mask 80 at the area of the second groove 5 to be formed. The grooves 3 and 5 are mutually connected in a more or less fluent manner by the adjoining masks 80 and 90. Then the masks 80 and 90 are removed through etching, upon which a metallization 43 and an optoelectronic component 40, here a diode laser provided with conducting layers 41, 42, are provided within the second groove 5. Then a second layer 4 of a radiation-guiding material is provided, in this case through spin-coating of a solution of a polymer material whose composition is shown in FIG. 7. The second layer 4 forms a waveguide 20 (see FIG. 2) at the area of the first groove 3. In addition to the fact that devices according to the invention, i.e. devices whose waveguide 20 has very smooth walls and bottom, are obtained by this method, the method has the advantages that it is simple, that no or substantially no reflections occur during photolithography, and that the width and depth of the groove 3 can be adjusted in a controlled and therefore accurate manner. After the second layer 4 has been provided and an opening has been made therein at the area of the metallization 43, the layers 43 and 42 are connected to a voltage source (not shown in the Figures) by means of, for example, wire connections (not shown in the Figures). After cleaving of the silicon substrate 1, the device according to the invention as shown in FIG. 1 is obtained, whose dimensions are approximately $0.5 \times 1$ cm$^2$.

The invention is not limited to the embodiment described, since many modifications and variations are possible to those skilled in the art within the scope of the invention. Thus different polymer materials may be used than those mentioned in the example. It is alternatively possible to use an anorganic material, such as lithium niobate, for forming the radiation-guiding layer.

I claim:

1. An optoelectronic semiconductor device with a waveguide, comprising a semiconductor body with a silicon substrate on which are present in that order a first layer of a material comprising silicon oxide and having a groove in the oxide and a second layer of a radiation-guiding material which forms the waveguide at an area of the groove, characterized in that the groove and a portion of the first layer are formed by means of local oxidation of the silicon substrate such that the groove is formed with substantially smooth walls and bottom, and in that said silicon oxide is thinned at both its upper and lower surfaces at the area of the groove.

2. An optoelectronic semiconductor device as claimed in claim 1, characterized in that the radiation-guiding material comprises a non-linear optical material.

3. An optoelectronic semiconductor device as claimed in claim 1, characterized in that the radiation-guiding material comprises an organic polymer.

4. An optoelectronic semiconductor device as claimed in claim 1, characterized in that a thickness of the first layer outside the groove lies between approximately 2 and 4 $\mu$m, a width and a depth of the groove lie between approximately 2 and 20 $\mu$m and approximately 0.1 and 1 $\mu$m, respectively, and a thickness of the second layer lies between approximately 0.1 and 10 $\mu$m.

5. An optoelectronic semiconductor device as claimed in claim 1, characterized in that the first layer comprises a second groove, which is situated in an extended direction of the first groove, which is deeper and wider than the first groove, and which contains an optoelectronic element of which an optically active region is at the level of the first groove.

6. An optoelectronic semiconductor device as claimed in claim 1, characterized in that the device comprises a semiconductor diode laser.

7. An optoelectronic semiconductor device as claimed in claim 1, characterized in that the first layer comprises a second groove, which intersects the first groove.

8. An optoelectronic semiconductor device as claimed in claim 7, characterized in that the second groove is also formed by means of local oxidation of the substrate, and simultaneously with the first groove.

* * * * *